United States Patent [19]
Darcie et al.

[11] Patent Number: 5,694,234
[45] Date of Patent: Dec. 2, 1997

[54] WAVELENGTH DIVISION MULTIPLEXING PASSIVE OPTICAL NETWORK INCLUDING BROADCAST OVERLAY

[75] Inventors: Thomas Edward Darcie, Middletown; Nicholas J. Frigo, Atlantic Highlands; Patrick P. Iannone, Edison; Kenneth C. Reichmann, Hamilton Square, all of N.J.

[73] Assignee: Lucent Technologies Inc., Murray Hill, N.J.

[21] Appl. No.: 527,967

[22] Filed: Aug. 14, 1995

Related U.S. Application Data

[63] Continuation-in-part of Ser. No. 326,576, Oct. 20, 1994, abandoned.

[51] Int. Cl.$^6$ .............................. H04J 14/02; H04J 14/00
[52] U.S. Cl. ......................... 359/125; 359/121; 359/128; 359/137
[58] Field of Search .................... 359/124, 125, 359/127, 166, 167, 168, 121, 114, 115, 135, 137, 130

[56] References Cited

U.S. PATENT DOCUMENTS

| | | | |
|---|---|---|---|
| 5,058,102 | 10/1991 | Heidemann | 359/125 |
| 5,119,223 | 6/1992 | Panzer et al. | 359/135 |
| 5,136,411 | 8/1992 | Paik et al. | 359/125 |
| 5,202,780 | 4/1993 | Fussganger | 359/125 |
| 5,221,983 | 6/1993 | Wagner | 359/125 |
| 5,241,409 | 8/1993 | Hill et al. | 359/117 |
| 5,272,556 | 12/1993 | Faulkner et al. | 359/125 |
| 5,285,305 | 2/1994 | Cohen et al. | 359/137 |
| 5,479,286 | 12/1995 | Stalley et al. | 359/168 |

OTHER PUBLICATIONS

Electronic Letters "Use of a Fibre Loop Reflector as Downstream Receiver and Upstream Modulator", vol. 26, No. 6, pp. 827–828.

Photonics Technology Letters, "Integrated Optics NxN Multiplexer on Silicon", Oct. 1991, vol. 3, No. 10.

Electronic Letters "Experimental Demonstration of a Passive Optical Subscriber Loop Architecture", vol. 24, No. 6, pp. 344–345.

Electronic Letters "Led Spectral Slicing for Single-Mode Local Loop Applications", vol. 24, No. 7 pp. 389–390.

Electronic Letters "Passive Optical Local Networks for Telephone Applications and Beyond", vol. 23, No. 24, pp. 1255–1257.

Proc 2 Annu Broadband Expo 14 Fiber Opt Comm Local Area Network Expo Broad Band 90. "Bi-Directional Broadband Local Network Evolution", pp. 314–318.

BT Technical Journal Apr. 1993, "inpact of New Optical Technology on Spectrally-Sliced", pp. 46–55.

C. Dragone, "An N X N Optical Multiplexer Using a Planar Arrangement of Two Star Couplers", IEEE Photonics Technology Letters, vol. 3, No. 9, pp. 812–185, Sep. 1991.

*Primary Examiner*—Leo Boudreau
*Assistant Examiner*—Bhavesh Mehta

[57] ABSTRACT

A passive optical network is provided that spectrally slices optical signals transmitted in both upstream and downstream directions utilizing wavelength division multiplexing routing. The passive optical network preferably includes an incoherent signal source at both ends to provide signals that are spectrally sliced according to optical frequency. The downstream information may be transmitted in a conventional data format. The upstream transmissions may be segregated by subcarrier multiplexing, time scheduling or wavelength division multiplexing. A broadcast signal can be overlayed with point-to-point information for transmission to plural network units.

20 Claims, 8 Drawing Sheets

0.00000 s        50.000 ns       100.000 ns
        10.0 ns/div    REALTIME 0.00000 s        50.000 ns       100.000 ns
        10.0 ns/div    REALTIME 0.00000 s        50.000 ns       100.000 ns
        10.0 ns/div    REALTIME 0.00000 s        50.000 ns       100.000 ns
        10.0 ns/div    REALTIME

WAVELENGTH DIVISION MULTIPLEXING PASSIVE OPTICAL NETWORK INCLUDING BROADCAST OVERLAY

CROSS-REFERENCE TO RELATED APPLICATION

This application is a continuation-in-part of U.S. patent application Ser. No. 08/326,576, filed Oct. 20, 1994, now abandoned.

BACKGROUND OF THE INVENTION

1. Field of the Invention

The present invention relates to a wavelength-division multiplexing passive optical network with broadcast overlay capabilities.

2. Description of the Related Art

Passive optical networks require no active components for directing optical signals between a central office or host digital terminal, and a network subscriber's terminal equipment. Passive optical networks, therefore, require no power or processing in the field to deliver optically encoded information to its destination. Typically, a passive optical network for telephone applications includes a first fiber star formed as a plurality of optical paths extending from the central office to a set of remote nodes. Downstream optical signals are transmitted from the central office to the remote nodes, where the signals are passively split and distributed at each node to one of a plurality of units of network subscriber equipment forming a second star. The network units may transmit optically encoded signals upstream to the remote node to form a multiplexed signal for delivery to the central office. Lasers are generally used to generate light used to form the transmitted light signals.

SUMMARY OF THE INVENTION

The present invention provides a wavelength division multiplexing passive optical network which utilizes incoherent light sources (e.g., LEDs) at both upstream and downstream transmitting locations. More particularly, the passive optical network of this invention includes a central office or host computer in optical communication with one or more optical network units wherein both the central office and optical network units contain broadband incoherent sources and receivers for transmitting/receiving optical data. Optical data is routed to/from the optical network units via an optical routing coupler located at a remote node, a wavelength division multiplexer (WDM) or preferably, a wavelength division multiplexing router (WDM/R). The wavelength division multiplexing router spectrally slices and distributes received light by wavelength, or, spectrally combines selected portions of the broadband spectrum depending on broadcast direction. The upstream and downstream signal sources may transmit at separate wavelength bands, e.g., 1.3 μm and 1.5 μm, respectively. A broadband signal such as a broadcast TV or radio signal can be overlayed onto a point-to-point signal to provide broadcast capabilities to the system.

Downstream information, i.e., optical information provided by the central office, transmitted with a broadband source such as an amplified LED or an erbium-doped fiber amplifier, in lieu of a conventional multi-wavelength source, such as a laser, offers several advantages. First, spectral slicing of a signal generated within a broadband signal source permits transmitting in a broadcast mode. Accordingly, in addition to being capable of transmitting a signal point-to-point between the central office and a desired ONU, the present invention allows a common signal (e.g., a broadcast TV signal) to be transmitted between the central office and each of the ONUs without the need for individual formatting and packaging. One advantage of LEDs is that they are a mature technology and can be more cost effective than lasers when broadcast signals are to be delivered. Accordingly, sources and detectors are readily available at present for deployment as an FTTH for low cost. By using LEDs at both ends of a passive optical network, technological implementation can take place now without the need to wait for development of economical multiwavelength sources. Finally, implementation of the present network is compatible with RITE-Net™ design for compatibility with future upgrades.

DETAILED DESCRIPTION

Figure 1:
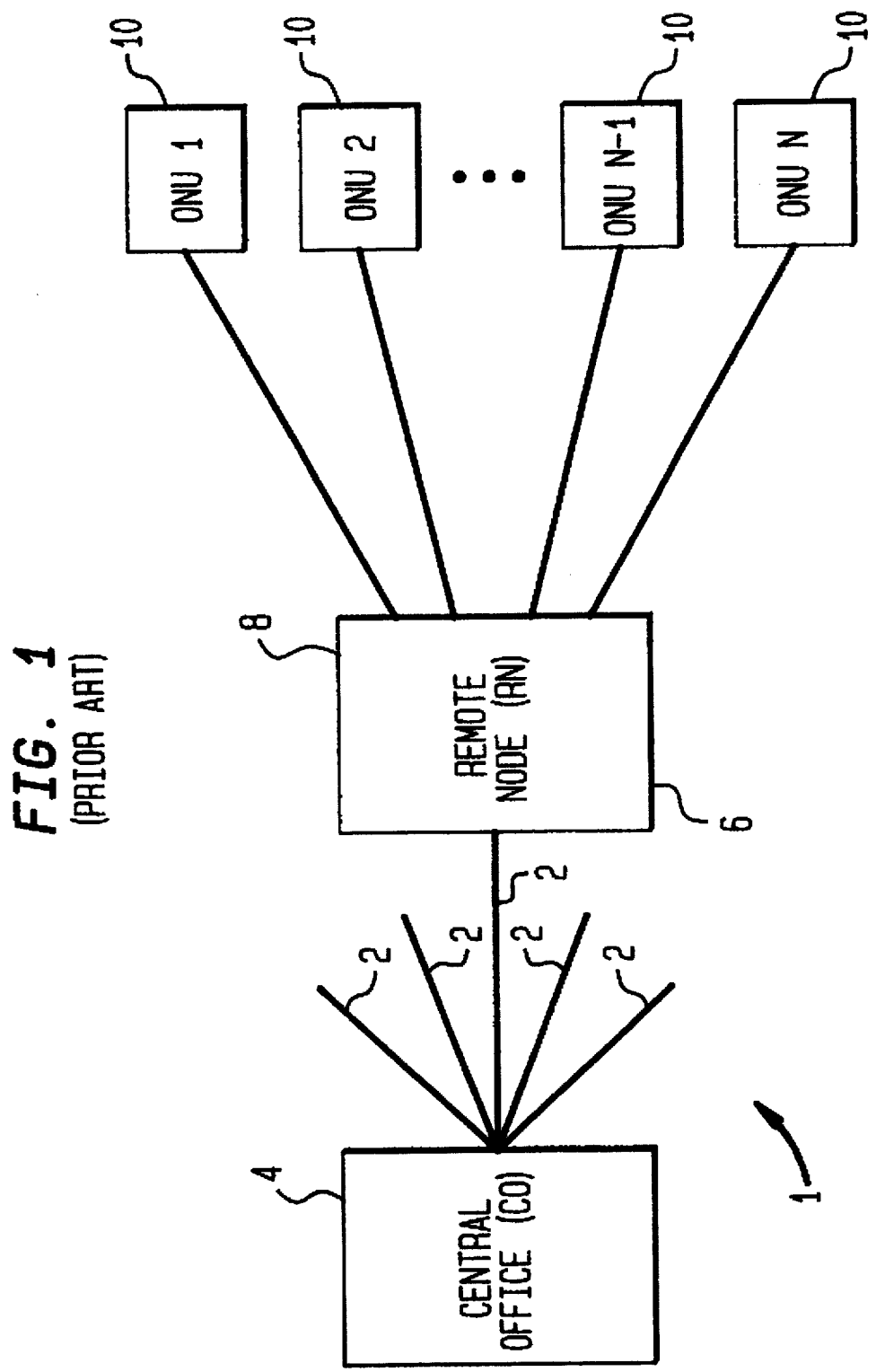
FIG. 1 illustrates a standard passive optical network model consisting of a first and second fiber star.

A standard passive optical network model is shown in FIG. 1, consisting of a first fiber star 1, typically a plurality of optical fibers 2 extending from a central office 4, to each one of a plurality of remote nodes 6, i.e., $RN_1$, $RN_2$, . . . $RN_N$. Downstream signals are transmitted from the central office towards the remote nodes for further distribution. At the remote nodes, light is passively split and distributed via a plurality of optical fibers 8 (a second star) to a plurality of optical network units 10, i.e., $ONU_1$, $ONU_2$, . . . $ONU_N$. The optical network units provide service to one or more end users wherein each downstream optical signal is received and electronically distributed to end users. The optical network units 10 may transmit upstream signals which are combined at the remote node. Each remote node 6 (or passive star) passively combines transmissions from the optical network units 10 onto single optical fiber 2 for distribution to the central office. Stern, et al., *PASSIVE OPTICAL LOCAL NETWORKS FOR TELEPHONE APPLICATIONS AND BEYOND, ELECTRON LETTERS*, vol. 23, pgs. 1255–57 (1987).

Two passive optical network architectures (PON) which will be discussed herein are conventional PONs such as telephony over passive optical networks (TPON) (see STERN et al.) and wavelength division multiplexing passive optical networks (WDM PONs). In a TPON architecture, a central office broadcasts a downstream optical signal to all optical network units using time-division multiplexing (TDM) protocol. A laser with a common wavelength band, requiring synchronization, may also be used. TDM typically includes a frame of information subdivided into time slots assigned to individual optical network units. Wavelength division multiplexing passive optical networks utilize an architecture within which each optical network unit or subscriber is assigned a unique wavelength by the central office. Signals destined for each remote node are created by modulating light at N distinct wavelengths (one for each optical network unit) at the central office. The modulated light signals are multiplexed onto a fiber directed to the remote node. The downstream signals are split and distributed to the optical network unit as a function of wavelength by means of a wavelength division demultiplexer (WDM) at the remote node. In the upstream transmission direction (optical network unit to remote node), the light is transmitted typically by laser at assigned wavelengths consistent with the above WDM.

RITE-Net™ is one type of wavelength division multiplexing passive optical network that uses a wavelength division multiplexing router (WDM/R) at the remote node, which distinguishes it from a conventional wavelength division multiplexing passive optical network. Wavelength division multiplexing router couplers are described in a paper by Dragone, An NxN Optical Multiplexer Using a Planer Arrangement of Two Star Couplers, IEEE *Phot. Technol. Lett*. Within the RITE-Net™ architecture, a multiwavelength laser at the central office sends multiplexer optical signals encoded with data at specific wavelengths to the remote node. At the remote node, the downstream signals are routed by the wavelength division multiplexing router according to wavelength to the optical network units. The separation between frequencies of the WDM/R (mode spacing) sets the system's channel spacing. The central office transmitter is designed such that its mode spacing closely matches that of the WDM/R. An electronic sequencer and a control circuit insure that data signals modulate the transmitter at the appropriate wavelengths. At the optical network unit, a portion of the received light is overmodulated with subscriber data and looped back through the remote node to the central office. That is, a modulator at the optical network unit imprints upstream information on a gated CW portion of the downstream signal which is then directed back to the remote node. Such a network is referred to as a RITE-Net™ network, as described in commonly-owned U.S. patent application Ser. No. 08/029,724, filed Mar. 1, 1993, and incorporated herein by reference.

In LAR-Net™, another wavelength division multiplexing passive optical network, the need for the RITE-Net™ modulator at the ONU is avoided. Multi-wavelength signals are sent from the central office over single fibers to a remote node for routing by wavelength to different optical network units. A coupler at the optical network unit combines/separates upstream and downstream traffic, directing the downstream traffic to a receiver. A broadband incoherent signal source, such as an LED, is provided for transmitting upstream communications, replacing the RITE-Net™ modulators. The upstream signal is spectrally sliced at the remote node (i.e., the wavelength division multiplexing router) into appropriate wavelength bands to prevent spectral overlap of upstream signals. LAR-Net™ network is described in commonly-owned U.S. patent appln. Ser. No. 08/261,5844, filed Jun. 17, 1994, and incorporated herein by reference.

Variations on the LAR-Net™ method have been implemented. Reeve et al., LED Spectral Slicing for Single-mode Local Loop Applications, Electronic Letters, vol. 24, no. 7, pgs. 389–90 (1988), discloses a system within which each subscriber receives a dedicated wavelength channel comprising different wavelength slices from the spectrum of identical LEDs. The system utilizes two wavelength division multiplexing couplers to implement the spectral slicing. A second variation is disclosed by Wagner et al., Experimental Demonstration of a Passive Optical Subscriber Loop Architecture, Electronic Letters, vol. 24, no. 6, pgs. 244–45 (1988). A system is disclosed therein that employs multichannel wavelength division multiplexing technique to provide each subscriber with a dedicated channel to/from the central office.

Figure 2:
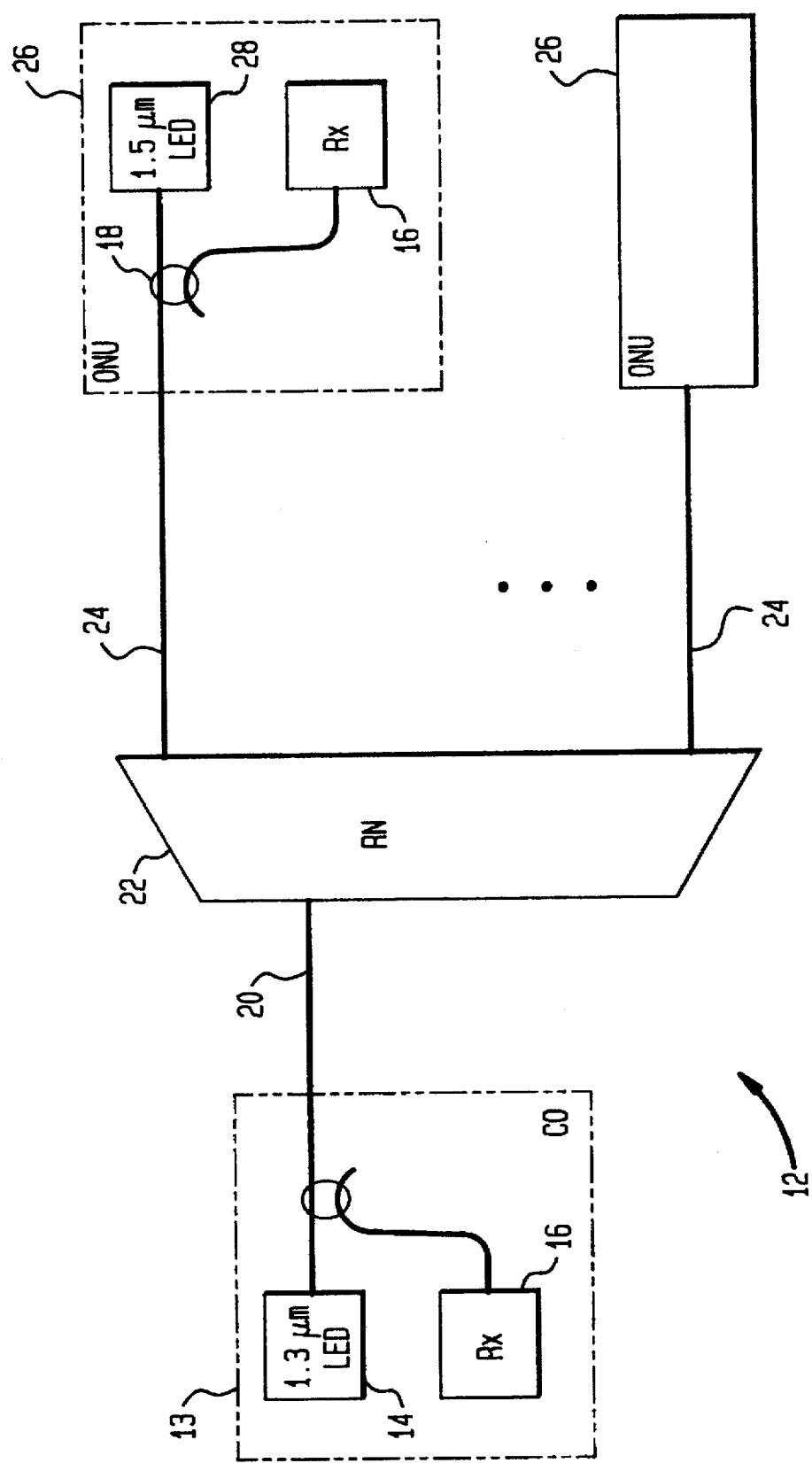
FIG. 2 illustrates one embodiment of a wavelength division multiplexing passive optical network in accordance with the present invention.

One embodiment of a wavelength division multiplexing passive optical network with bi-directional optical spectral splicing 12 of this invention is shown in FIG. 2. Passive optical network 12 includes a central office 13 connected by a single fiber 20 to a remote node 22. Remote node 22 includes a wavelength router, preferentially, one such as the wavelength division multiplexing router (WDM/R) discussed above, which wavelength slices the downstream signal transmitted from central office 13. The sliced portions of the downstream signal are distributed along single fibers 24, to each of a number of optical network units 26. The central office 13 and each of the optical network units 26 contain coarse wavelength division multiplexing optical couplers 18, optical receivers 16 and LEDs 14, 28, respectively, to effect communication channels. The coarse WDM couplers 18 located at the central office multiplex/demultiplex the downstream/upstream signals directed to/from the remote node via fiber 20. Distinct downstream and upstream wavelength bands are chosen to avoid reflection, crosstalk, etc., e.g., 1.3 µm and 1.5 µm, respectively. The WDM couplers 18 located at the optical network units multiplex/demultiplex the upstream/downstream information transmitted along fiber 24 from/to remote node 22. When used herein, the expressions $\lambda^{dj}$ and $\lambda^{uk}$ describe slices of the downstream and upstream wavelength bands, respectively.

When a downstream signal arrives at remote node 22, the wavelength division multiplexing router (WDM/R) contained therein insures that each downstream port j receives slices of the transmitted signal particular to the optical network unit to which it is directed. The periodicity of the wavelength division multiplexing router (WDM/R) insures that each port j receives a signal containing approximately the same optical power, assuming the wavelength spread of LED 14 is large relative to the router's (WDM/R's) free spectral range (FSR). That is, if there are N optical ports, $\lambda^{dj+mN}$ is the wavelength band that will appear at port j for an integral m which serves as an index for the FSRs. If the router's FSR is small compared to the LED's spectral width, then each port j receives approximately the same power Pj. Each $P_j$ is equal to the scaled central office output power ($P_o$) over N, i.e., $$P_j = \sum_m \alpha_m P(\lambda^{dj+mN}) \approx \alpha P_o/4,$$

where $\alpha$ is a constant that incorporates various sources of excess loss. In contrast, only $\lambda^{dj}$ will appear at port j in a conventional WDM, i.e., only for m=0, resulting in a lower value of $P_j$.

In the upstream transmission direction, the entire optical signal generated within LED 28 (at each optical network unit 26) is frequency selectively directed via each coarse WDM coupler 18 to the remote node 22 via fiber 24. Due to the properties of the WDM/R, remote node 22 combines a sliced version of the LED spectrum generated within each optical network unit onto a single optical fiber and directs it to the central office. The sliced spectra are automatically interleaved such that the optical frequencies from distinct optical network units do not overlap, thereby preventing, for example, unwanted beat noise. Collisions of the signals broadcast from a plurality of optical network units are avoided at the central office by scheduling, by sub-carrier multiplexing (SCM), or by wavelength division (de) multiplexing (WDM). Scheduling is a form of time division multiplexing where, for example, different signals at the same frequency which are transmitted from optical network units are delegated to predefined, calibrated time slots in accordance with a system clock. SCM is an arrangement where optical signals transmitted from each optical network unit or central office 13 are coded into unique RF subcarriers that modulate the LED 28 generated broadband light. By construction of the WDM or WDM/R, the signals are naturally segregated by wavelength and are therefore amenable to demultiplexing using a wavelength division multiplexer. At the central office, the light received from the remote node is either segregated in time, as in the case of scheduling, or segregated by RF frequency, in the case of SCM, or by wavelength band in the case of WDM, and processed accordingly.

Figure 3:
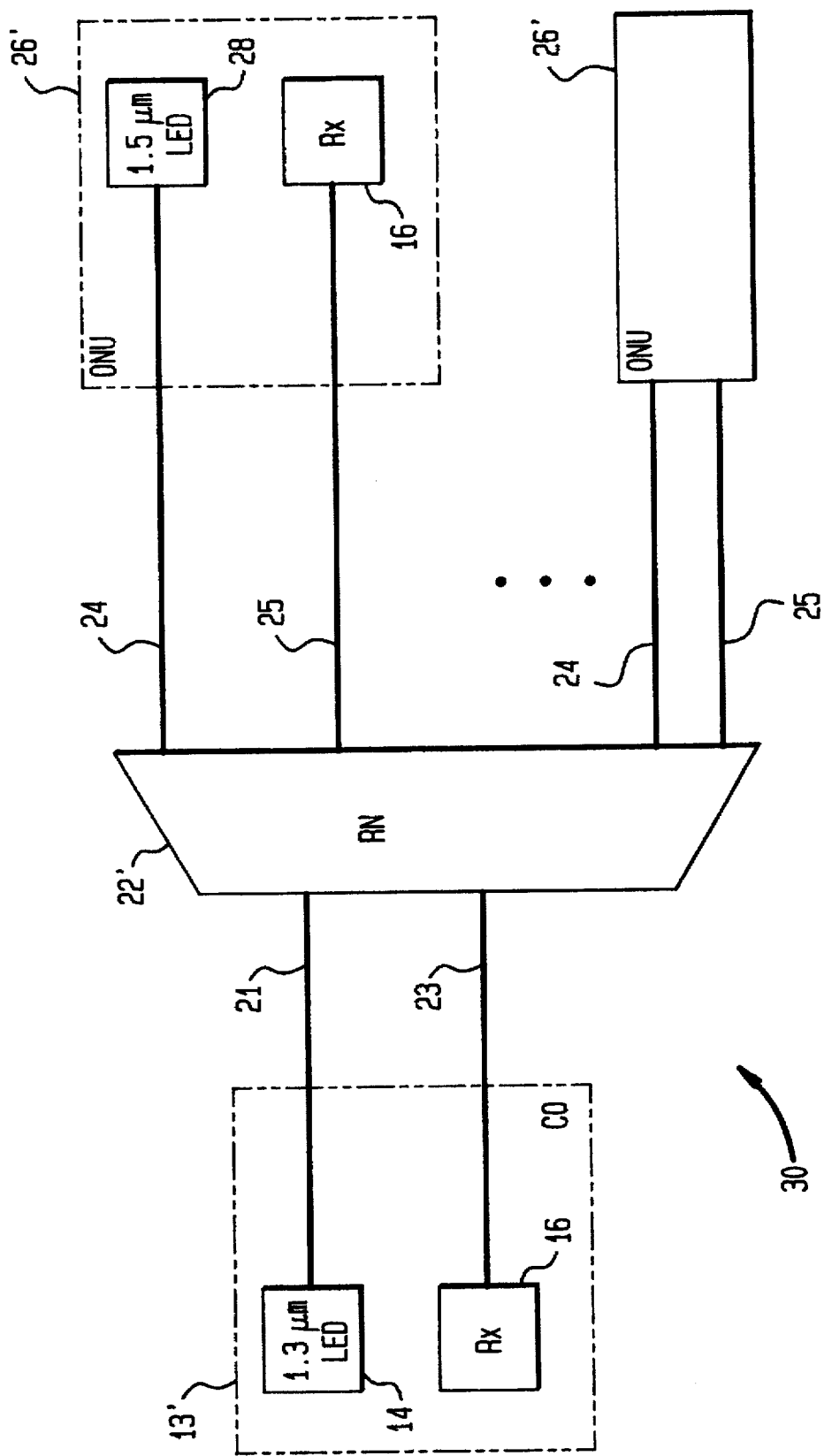
FIG. 3 illustrates another embodiment of the present invention wherein the passive optical network includes at least one central office connected to a remote node via at least two optical fibers.

A second embodiment of this invention, a passive optical network 30, is shown in FIG. 3. Passive optical network 30 includes a central office 13' connected to at least one remote node 22' via at least two optical fibers 21 and 23. Fiber 21 forms a dedicated downstream path between remote node 22' and LED 14, and fiber 23 forms a dedicated upstream path between remote node 22' and receiver 16. On the downstream side of remote node 22', a pair of fibers 25, 24, form dedicated downstream and upstream paths to receiver 16 and LED 28, respectively, thereby connecting the remote node to each of the plurality of optical network units 26'. The coarse WDM couplers 18 that were described above are generally not required within passive optical network 30 due to the presence of the dedicated upstream and downstream paths 25, 23, and 21, 24, respectively. While the two for one optical fiber requirement for this embodiment reduces the number of users which can be supported by each WDM/R-based remote node 22', implementation of such a network provides a vehicle for the implementation of future technologies directed towards formation of an efficient, high-performance network.

A prototype of passive optical network 30 of FIG. 3 was built and tested at a baseband transmission of 40-Mb/s at various launched power levels. A 4×4 wavelength division multiplexing router (WDM/R) was used at the remote node 22' in the prototype, but connected to only one optical network unit 26' for simplicity in testing. Receiver 16 at optical network unit 26' was implemented with a commercially available AC-coupled PIN FET.

Figure 4A:
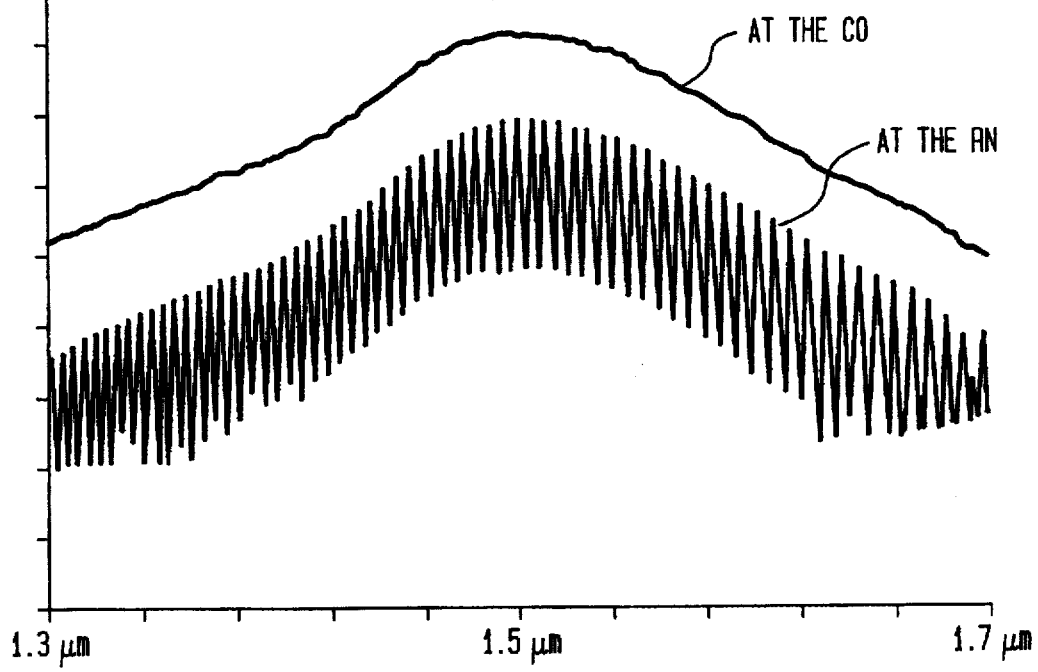
FIGS. 4A and 4B are display photos highlighting the optical spectra captured from an LED within an optical network unit.
Figure 4B:
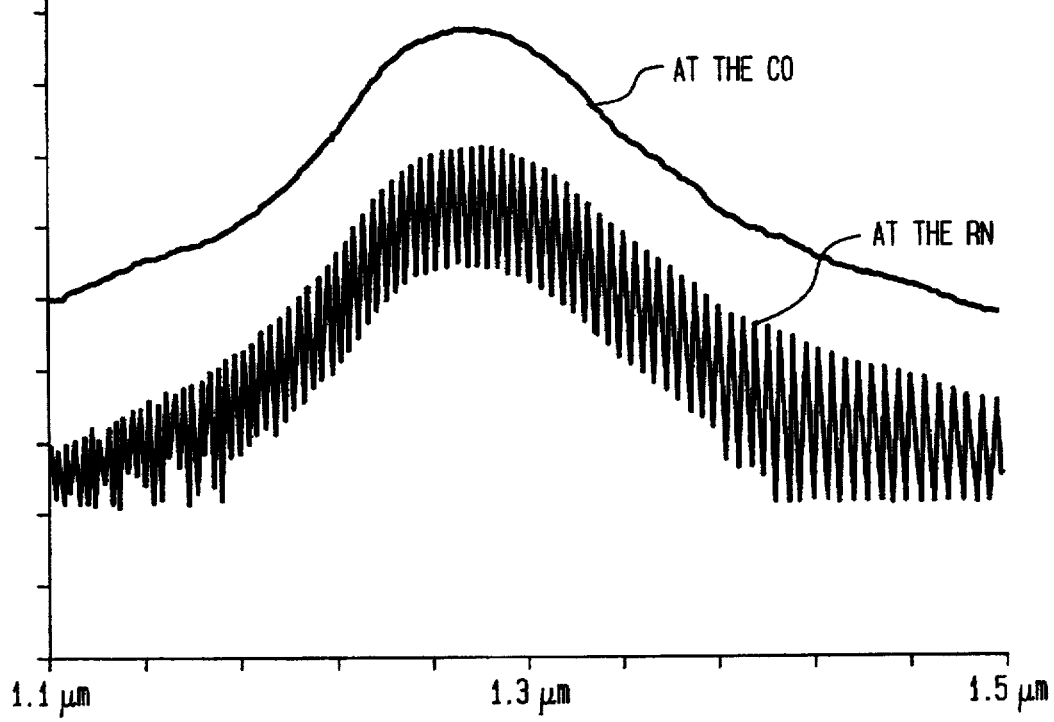

FIGS. 4A and 4B are display photos highlighting the optical spectra captured from LED 28 within optical network unit 26' at a wavelength band of 1.5 μm, and LED 14 within central office 13' at a wavelength band of 1.3 μm, respectively, during prototype testing. The signals generated within the LEDs are shown in each figure both before and after spectral slicing. The LEDs were directly modulated at 100% modulation depth with a non-return-to-zero (NRZ) pseudo-random data stream. launched powers for each LED were varied from the LED's maximum rated value $P_{L,max}$ down to a value resulting in a detected minimum power required for $1 \times 10^{-9}$ BER $P_{R,min}$. Electrical crosstalk generated by reflected light impinging on receivers was found to be negligible relative to receiver thermal noise during testing. It can be assumed, therefore, with such an arrangement, that the electrical crosstalk between dedicated upstream and downstream fibers leads to no appreciable performance degradation.

Figure 5A:
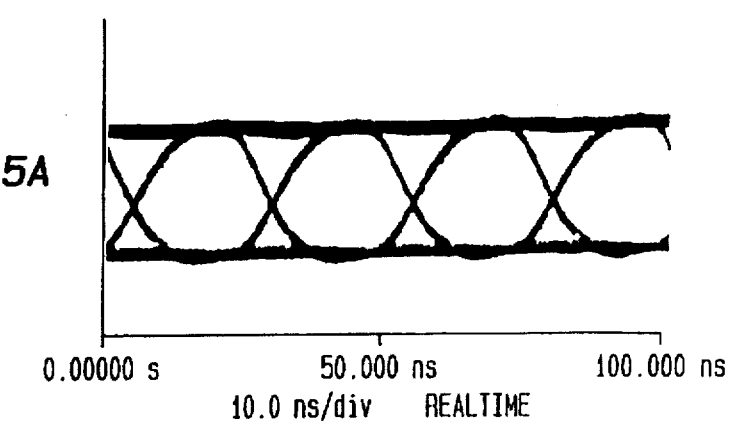
FIGS. 5A, 5B, 6A, 6B, 7A and 7B show received eye patterns from downstream and upstream transmissions.
Figure 5B:
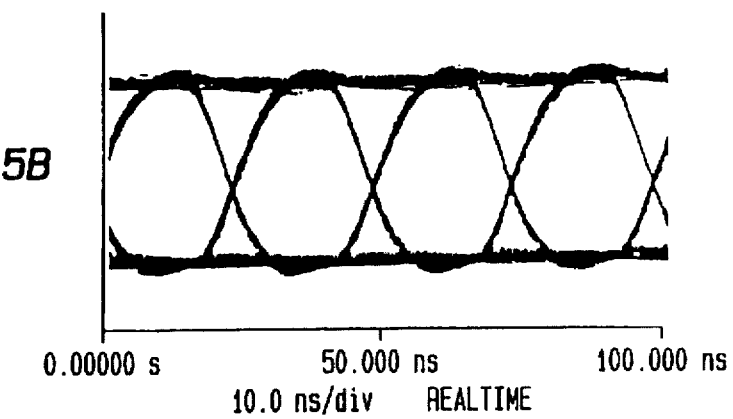

FIGS. 5A and 5B each show received eye patterns for downstream and upstream transmission through the prototype during testing, respectively. Eye patterns are bit-train waveforms seen on a display, the time base of which is typically set to trigger at the bit rate of the transmitted (or broadcast) signal. The shape of the eye pattern gives the viewer an indication of both random (noise) and deterministic variations in the received signal which can give rise to errors. The wide open eyes in these figures are indicative of low error rate operation. The patterns correspond to maximum rated launched power levels of LEDs 14 and 28, respectively. The launched downstream power, $P_{L,max}$, of LED 14 at Co 13' was measured at −13.3 dBm, and the launched upstream power, $P_{L,max}$, of LED 28 at optical network unit 26' was measured at −17.5 dBm. The corresponding received powers were found to be −32.3 dBm and −34.5 dBm, respectively, at the downstream and upstream receivers, respectively.

Figure 6A:
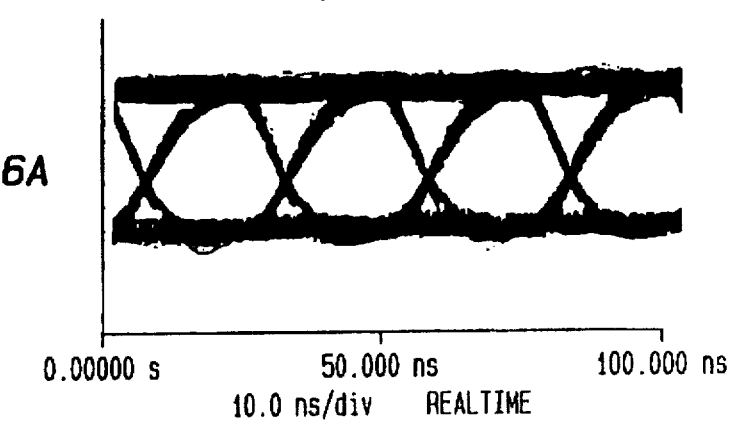
Figure 6B:
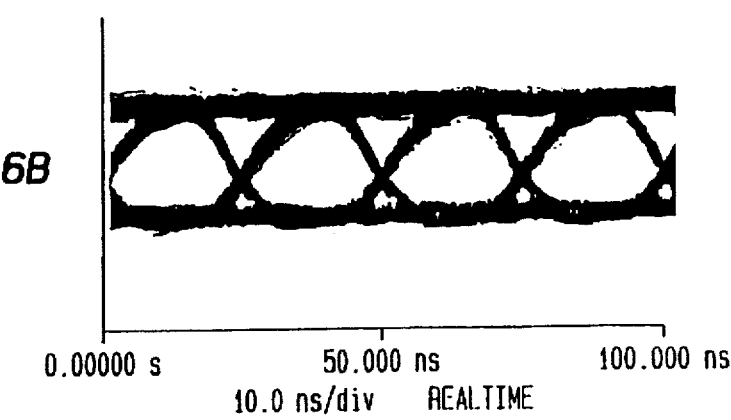

FIGS. 6A and 6B show received eye patterns for downstream and upstream transmissions, respectively, after the launched LED power levels discussed in relation to FIGS. 5A and 5B were decreased by 10 dB within the prototype. The reduction of launched power by 10 dB was found to lower the received power levels to levels commensurate with power losses which would occur during actual field condition transmission. FIGS. 6A and 6B are patterns derived from the wavelength division multiplexing router (WDM/R) at remote node 22' when optimized for 1.5 μm operation. The resulting downstream loss through the network was found to be 19 dB, exceeding the total upstream loss of 17 dB by 2 dB. Six (6) of the 17 dB are due to the 1×4 split. Of the remaining 11 dB loss, 1 dB results from the connector and 10 db from the wavelength division multiplexing router, i.e., 3 dB from chip loss, 2 dB from pigtails, 1 dB from polarization and 4 dB as a result of the filter function.

Figure 7A:
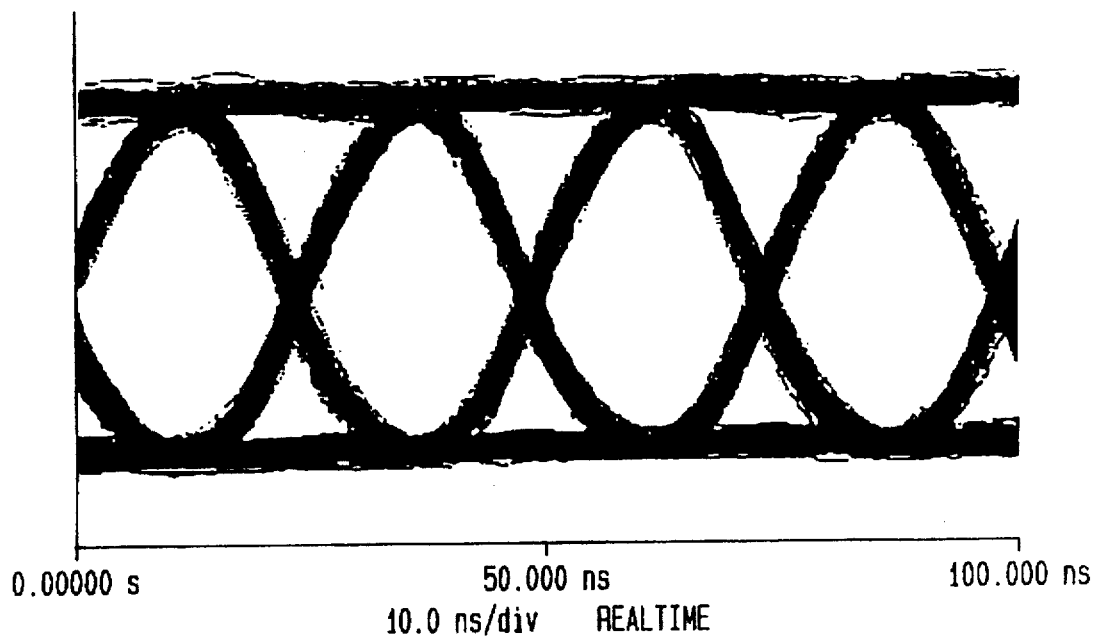
Figure 7B:
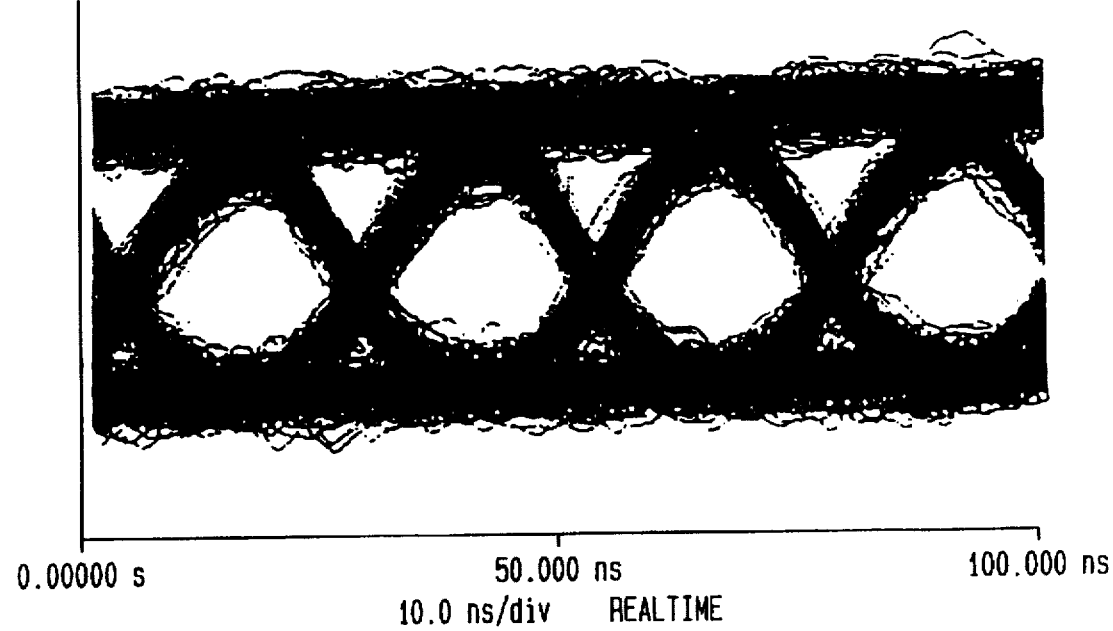

While power loss within transmitted signals is particularly relevant, another factor critical to transmission within a passive optical network is chromatic dispersion. In order to identify signal degradation due to chromatic dispersion, the upstream and downstream prototype transmission paths were implemented in the prototype with conventional single mode fibers that display a zero-dispersion value at 1.3 μm, i.e., λo equals 1.3 μm. At 1.5 μm transmission, the dispersion value was found to be 16 ps/(nm-km). FIGS. 7A and 7B show the combined effects of loss and dispersion, due to transmission through 8 km of the conventional signal mode fiber in the upstream and downstream directions, respectively, within the prototype. The launched powers were equal to −17.5 dBm and dBm −13.3 dBm, respectively. As the tests results indicate, the eyes remained open, with only slight evidence of distortion due to chromatic distortion, as seen in a comparison of the figures.

Figure 8:
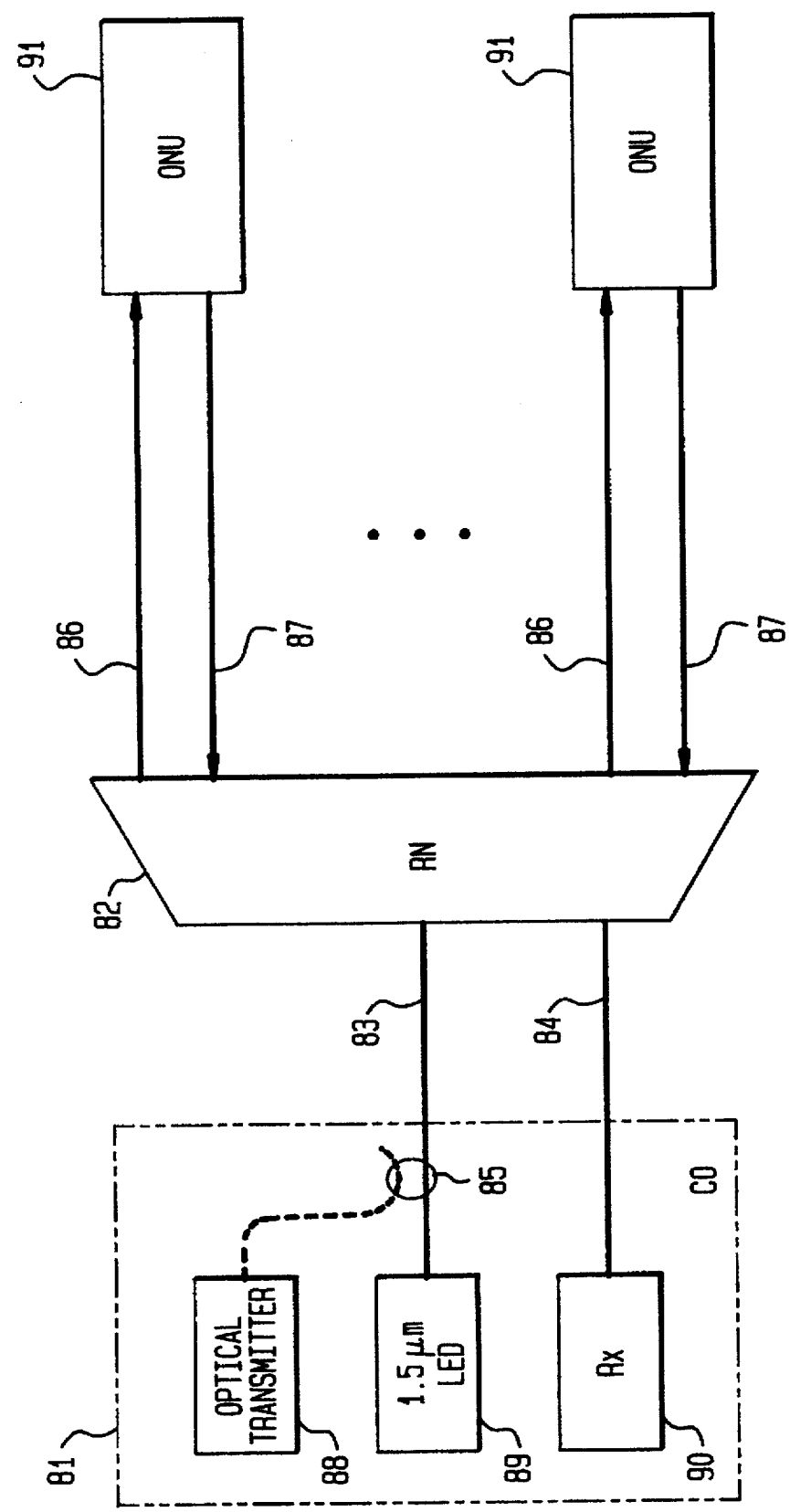
FIG. 8 illustrates an embodiment of a passive optical network including a broadcast video overlay.

In addition to having the capabilities of providing point-to-point communication, according to an embodiment of the present invention as depicted in FIG. 8, it is possible to provide a high-performance WDM PON with a broadcast overlay. As shown, passive optical network 80 includes central office 81 connected to at least one remote node 82 via at least two optical fibers 83 and 84. Fiber 83 forms a dedicated downstream path between central office 81 and remote node 82 and fiber 84 forms a dedicated upstream path between remote node 82 and central office 81. On the downstream side of remote node 82, each pair of fibers 86 and 87 form dedicated downstream and upstream paths, respectively, to a corresponding ONU 91, thereby connecting remote node 82 to a plurality of ONUs 91.

Central office 81 includes optical transmitter 88, 1.5 μm LED 89, optical receiver 90 and wavelength division multiplexing optical coupler (WDM) 85. LED 89 is used, as in the previously described embodiments, for transmitting downstream baseband data for point-to-point communication to each of ONUs 91. Also as described in the previous embodiments, receiver 90 receives upstream information from remote node 82 via fiber 84. Optical transmitter 88 can consist of a broadband optical transmitter such as an LED, for distributing a broadcast signal to ONUs 91. For example, for distributing broadcast video, a digital satellite signal can be received via a commercially available direct satellite receiver (not shown) provided at central office 81. The received signal, after block conversion into a predefined RF band, can be used to directly modulate broadband optical transmitter 88. The broadband output of optical transmitter 88 is then combined or overlayed with the downstream 1.5 μm baseband data signal from LED 89, by coupler 85. The broadcast signal can be coupled onto downstream fiber 83 utilizing several different methods. For example, the broadcast signal can be optically coupled in the same optical band as the baseband data signal from LED 89 using a passive combiner. In the alternative, the broadcast signal can be optically coupled with a different optical band than the baseband data signal from LED 89 using a passive combiner or a WDM. When utilizing optical coupling in the same band (e.g., 1.5 μm for both the broadcast and baseband signals), the signals can be separated utilizing a TDM protocol or a SCM protocol. When utilizing optical coupling with different bands (e.g., 1.5 μm for the baseband signals and 1.3 μm for the broadcast signals), a WDM protocol, a TDM protocol or a SCM protocol may be suitably used to separate the signals.

As described in the previous embodiments, the point-to-point information from LED 89 is routed to the appropriate ONU by remote node 82. The broadcast signal is spectrally sliced at remote node 82, with approximately equal powers being directed to each ONU 91. At ONU 91, the downstream broadband signal from optical transmitter 88 and the baseband signal from 1.5 μm LED 89 are separated using an RF separation technique or an optical separation technique.

Figure 9A:
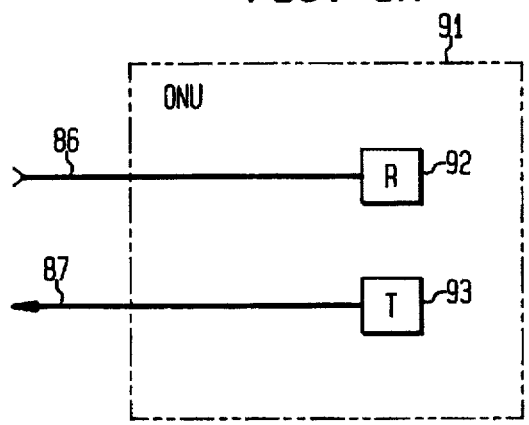
FIGS. 9A and 9B illustrate optical network units according to embodiments of the present invention.

According to an embodiment of the present invention as depicted in FIG. 9A, at ONU 91, receiver 92 receives the downstream optical signals and electronically demultiplexes the signals utilizing a known technique, such as a TDM or SCM demultiplexing technique. The point-to-point information can then be processed for receipt by a telephone or other terminal device, for example. The broadcast information can be processed for receipt by a television, for example. Transmitter 93 can consist of an optical source such as an LED, which can be modulated for transmitting upstream information, as described in previous embodiments.

Figure 9B:
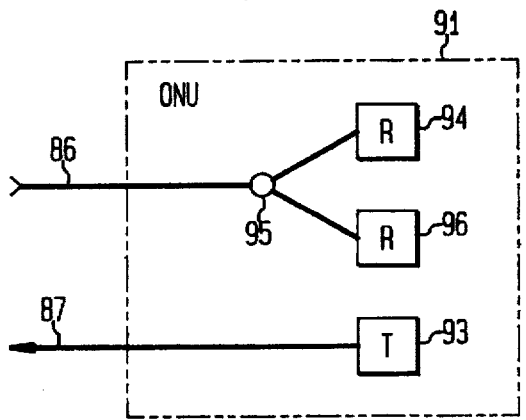

According to another embodiment of the present invention as depicted in FIG. 9B, at ONU 91, the received downstream optical signals are optically demultiplexes. For example, as depicted in FIG. 9B, optical decoupler 95 demultiplexes the optical signals such that the broadcast signal is directed to an appropriate receiver 94 where it can be processed as necessary for viewing on a television, for example. The baseband signal is directed to an appropriate receiver 96 where it can also be processed as necessary for receipt by a telephone or other terminal device, for example.

Figure 10A:
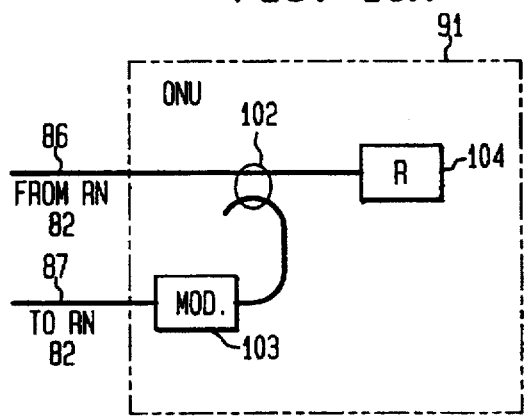
FIGS. 10A and 10B illustrate RITE-NET™ optical network units according to various embodiments of the present invention.

Another embodiment of the present invention for performing electrical separation of the downstream signals utilizing a RITE-Net™ type architecture, is depicted in FIG. 10A. As shown, at ONU 91 the downstream optical signals (e.g., both the broadcast information and point-to-point information) are received by coupler 102 via fiber 86. A portion of the received signal is modulated with upstream information by modulator 103 and looped back to RN 82 via fiber 87. A portion of the signal demultiplexed by coupler 102 is also provided to receiver 104 which can perform electrical separation of the received signals using a known technique (such as utilizing TDM or SCM techniques).

Figure 10B:
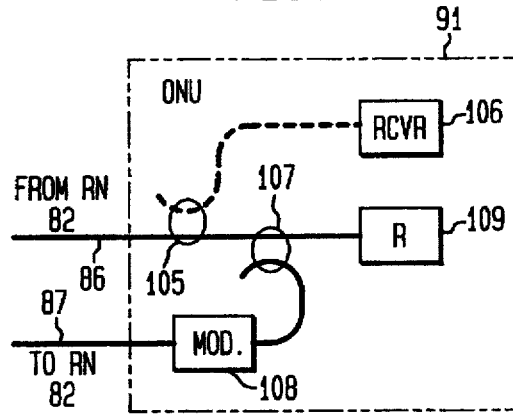

Still another embodiment of the present invention for performing optical separation of the downstream signals utilizing a RITE-Net™ type architecture is depicted in FIG. 10B. As shown, at ONU 91 the downstream optical signals are received from remote node 82 and split by coupler 105, with the broadcast portion of the signal being routed to receiver 106. The point-to-point information signal is routed to coupler 107, where a portion of the signal is directed to modulator 108 where it is modulated with upstream information for transmission to RN 82 via fiber 87. A portion of the point-to-point information signal demultiplexed by coupler 107 is also provided to receiver 109.

According to the above-described embodiments of the present invention, a broadband signal such as a broadcast TV signal, for example, can be provided to each ONU 91. Of course, the broadcast signal could also consist of a radio signal or any other desired type of broadcast signal. In addition, it should be appreciated that optical transmitter 88 could consist of a multi-frequency laser for providing additional point-to-point information to ONUs 91. In addition, it should also be noted that although the present invention has been described with respect to the use of dedicated downstream and upstream fibers, it should be apparent that the present invention may also be implemented utilizing a single fiber for both the downstream and upstream signals.

It follows that a passive optical network architecture defined according to this invention provides a number of distinct advantages over the prior art, most importantly, system implementation cost reductions. Because dedicated LEDs may be used for transmitting in both directions, the need for sources such as lasers operating at a discrete set of frequencies is avoided at both the central office and optical network units, and the need for modulators is avoided at the optical network units. By providing a broadband source also, a broadcast signal such as a TV or radio signal can be provided to all of the optical network units, thus providing another potential revenue producing service in the system. The broadcast overlay is also compatible with any upgrades to high performance WDM passive optical networks such as RITE-Net™, for example.

What has been described herein is merely illustrative of one or more particular applications of the principals of the present invention. Other arrangements and methods may be implemented, however, by those skilled in the art without departing from the scope or spirit of this invention.

What is claimed is:

1. A passive optical network utilizing bi-directional optical spectral slicing, comprising:

a) a remote node for receiving optically combined individual optical information and broadcast optical information and for routing said optical information through a plurality of output ports thereof by wavelength bands utilizing spectral slicing, said remote node having a periodicity property for placing said individual information into a different multiple wavelength band set at each one of said output ports, and for placing said broadcast information into a different multiple wavelength band set at each one of said output ports, wherein the wavelength bands within each of said multiple wavelength band sets are separated from each other; and b) a plurality of optical network units optically linked to said remote node output ports, each for receiving and separating said optically linked individual and broadcast optical information.

2. The passive optical network defined by claim 1, wherein said remote node includes a wavelength division multiplexing routing coupler (WDM/R).

3. The passive optical network defined by claim 1, further comprising a central office for transmitting said optically combined individual optical information and broadcast optical information.

4. The passive optical network defined by claim 3, wherein said central office includes plural incoherent optical signal sources and an optical signal receiver.

5. The passive optical network defined by claim 4, wherein said incoherent optical signal source at said central office operates at a different wavelength band than the wavelength band of said optical network units.

6. The passive optical network defined by claim 3, wherein said remote node is optically linked to said central office and said optical network unit, respectively, via a single upstream and a single downstream fiber.

7. The passive optical network defined by claim 3, wherein each said optical network unit includes means for RF subcarrier modulating upstream data signals and said central office includes means for segregating said received upstream data signals according to RF sub-carrier frequency.

8. The passive optical network defined by claim 3, wherein each said optical network unit includes means for time scheduling upstream data signals and said central office includes means for time segregating said received upstream data signals according to time.

9. The passive optical network defined by claim 1, wherein the individual and broadcast optical information are optically combined in the same wavelength band or different wavelength bands and are separated utilizing a time division multiplexing technique.

10. The passive optical network defined by claim 1, wherein the individual and broadcast optical information are optically combined in the same wavelength band or different wavelength bands and are separated utilizing a subcarrier multiplexing technique.

11. The passive optical network defined by claim 1, wherein the individual and broadcast optical information are optically combined at different wavelength bands and are separated utilizing a wavelength division multiplexing technique.

12. The passive optical network defined by claim 1, wherein the broadcast optical information comprises digital satellite signal information.

13. The passive optical network defined by claim 1, wherein the broadcast optical signal is generated by an incoherent optical source.

14. The passive optical network defined by claim 13, wherein the incoherent optical source comprises an amplified LED.

15. The passive optical network defined by claim 1, wherein substantially equal optical power is contained within each of said multiple band sets corresponding to said individual information, and substantially equal optical power is contained within each of said multiple band sets corresponding to said broadcast information.

16. The passive optical network defined by claim 1, wherein the wavelength bands within each multiple wavelength band set are periodically spaced from one another.

17. A passive optical network utilizing bi-directional optical spectral slicing, comprising:

a) a remote node for receiving optically combined individual information and broadcast information and for routing said optical information through a plurality of output ports thereof by wavelength bands utilizing spectral slicing, said remote node having a periodicity property that provides optical power corresponding to at least said broadcast information in a different multiple wavelength band set at each output port, each wavelength band set comprising a multiplicity of wavelength bands; and b) a plurality of optical network units optically linked to said remote node output ports, each for receiving and separating said optically linked individual and broadcast information.

18. The network according to claim 17, further comprising a central office for transmitting said optically combined individual and broadcast information, wherein said central office includes a multi-frequency laser for providing at least a portion of said individual information.

19. The network according to claim 18, wherein at least a portion of the individual information is provided to said optical network units in a wavelength division multiplexed protocol.

20. The network according to claim 18, wherein said central office further includes an incoherent optical source for providing a portion of said individual information.

* * * * *